United States Patent [19]

Manabe

[11] Patent Number: 5,975,865
[45] Date of Patent: Nov. 2, 1999

[54] PUMP ACTIVATED BY WAVE ENERGY

[75] Inventor: Yasuhiro Manabe, Yokohama, Japan

[73] Assignee: Taiyo Plant Co., Inc., Kanagawa, Japan

[21] Appl. No.: 08/982,712

[22] Filed: Dec. 2, 1997

[30] Foreign Application Priority Data

Dec. 3, 1996 [JP] Japan .................................. 8-323093

[51] Int. Cl.[6] .................................................. F04B 35/00
[52] U.S. Cl. .......................................... 417/331; 60/497
[58] Field of Search ............................... 417/331; 60/497

[56] References Cited

U.S. PATENT DOCUMENTS

| | | | |
|---|---|---|---|
| 644,093 | 2/1900 | Place | 417/331 |
| 692,420 | 2/1902 | Bryant | 417/331 |
| 1,665,140 | 4/1928 | Master | 417/331 |
| 3,126,830 | 3/1964 | Dilliner | 103/68 |
| 5,152,674 | 10/1992 | Marx | 417/331 |
| 5,842,838 | 12/1998 | Berg | 417/331 |

*Primary Examiner*—Timothy S. Thorpe
*Assistant Examiner*—Ehud Gartenberg
*Attorney, Agent, or Firm*—McCormick, Paulding & Huber LLP

[57] ABSTRACT

A wave pump activated by a wave energy for conveying a water to a desired place. The wave pump includes a tiltable hollow piston tube having an upper portion and a lower portion. The lower portion is communicated with a submerged pipe and the upper portion extends vertically upward toward a water surface. A piston portion is formed at an outer periphery of the hollow piston tube, and a cylinder which defines a cylinder chamber above the piston portion is fitted over the piston portion such that the cylinder can slide up and down. The cylinder is equipped with a float for moving the cylinder up and down such that a flow of water is generated in the hollow piston tube and submerged pipe.

12 Claims, 9 Drawing Sheets

PUMP ACTIVATED BY WAVE ENERGY

BACKGROUND OF THE INVENTION

TECHNICAL FIELD

The present invention relates to a wave pump activated by a wave energy, which is a clean natural energy, in consideration of today's serious problems on the earth such as earth warming, environmental destructions and energy resource shortage. The wave pump is a pump of high efficiency which may be used to feed a water to a raising or cultivation facility from the sea, ocean, lake, moss or pond made by a dam, to feed a sea water for pumped storage power generation, to feed a water for desalination of seawater, to exchange a water in a closed water area with an open sea water for clarification of the closed water area, to circulate an upper water (water near a water surface) and a lower water (water near a bottom of the water) for clarification or to feed a contaminated water to a deep area in a lake, moss or pond where a lot of ditch reeds grow from a bottom of the lake, moss or pond such that the water is purified by respiration of vegetation while the water is flowing through the ditch reeds.

The present invention also relates to a field of securing living aquatic resources such as fishery products and marine plants/algae and water resources such as potable water which are indispensable to human life by water exchanging in a harbor and water purification in an ocean, lake, moss, pond made by a dam and other water sources.

BACKGROUND ART

In that water area which is far from an oceanic water and is partly closed such as a harbor, a flow of water is sluggish so that a water near the water surface and that near the bottom unlikely mix each other. Consequently, oxygen does not prevail in a layer near the bottom of the water (referred to as "lower layer") sufficiently and precipitation likely occurs. In addition, nutrition needed for growth of plankton tends to lack in a layer close to the water surface (referred to as "upper layer").

In such a closed water area, therefore, it is desired to blend the water in the upper layer with that in the lower layer.

Incidentally, one of arrangements activated by a natural energy such as a wave power for carrying a water such as sea water to a particular place is publicly known from "Wave Pump"(Japanese Patent Application, Laid-Open Publication No. 61-255277). As illustrated in FIG. 9 of the accompanying drawings, this wave pump 110 has a cylinder 111 supported in the water and a piston 112 arranged in the cylinder 111 such that the piston can slidably move up and down. The piston 112 is moved up and down by a float 114 connected to the piston 112 via a chain 113 for water feeding.

Since the wave pump 110 is activated by vertical movement of the wave, it does need an energy source such as petroleum which may contaminate the environment, and it continuously operates almost forever once it is installed. Accordingly, the wave pump is a quite prominent pump.

Therefore, when the wave pump 110 is used as a water transfer means for mixing an upper layer water with a lower layer water in a closed water area, it is expected that the upper layer water and lower layer water are semiparmanently intermixed with an inexpensive cost.

In order to suck the upper layer water by this wave pump 110, however, a water suction opening of the pump should be positioned near the water surface. Accordingly, the water suction pipe 115 must extend to near the water surface and it should be supported from a separate buoy or the like. A similar thing can be said when the lower layer water is conveyed to the upper layer of the water by the wave pump. Therefore, the conventional wave pump becomes complex, has a lower water transmission efficiency and needs a higher manufacturing cost.

In addition, since the power of the float 114 of the wave pump 110 is transferred to the piston 112 via the chain 113, the chain and other parts tend to wear considerably and would possibly break.

The float 114 of the wave pump 110 is moored by the chain 113 and associated parts. Therefore, if the float 114 is embedded in a concrete caisson placed near a breakwater, for example, the concrete caisson becomes too large relative to a pump output.

Further, since an annular tube 116 for a joint ring is provided around the cylinder 111, care should be taken to strength of the annular tube such as bending moment and torsional moment, and a large resistance acts on the annular tube due to inertia of a fluid flowing in the annular tube in a pulsating manner which would result in deterioration of water conveyance efficiency.

SUMMARY OF THE INVENTION

An object of the present invention is to eliminate the above described problems and to provide a wave pump which has a simple structure but can continuously blend an upper layer water with a lower layer water semiparmanently in an effective manner, which can convey an upper layer water that often contacts the air and contains a relatively large amount of oxygen to a remote place such as a cultivation facility, and/or which can carry out pumped storage power generation using the sea water and/or desalt the sea water while taking advantage of pressurized water acquired from the wave pump for energy saving and resource saving.

In order to attain the above object, the present invention provides a wave pump activated by a wave energy of a type including a water suction part located in the water for drawing the water in the wave pump and a water conveyance part for transmitting the drawn water to a desired place from the wave pump, characterized in that the wave pump further includes a hollow inclinable piston tube having a lower portion communicated with the water conveyance part, an upper portion extending generally vertically toward the water surface and a piston portion formed around an outer periphery of the upper portion, a cylinder fitted over the piston portion of the hollow piston tube such that it can slide in up and down directions, a float attached to the cylinder for moving the cylinder up and down by the wave energy, and valve means provided on the water suction and conveyance parts respectively for generating a flow of water in the hollow piston tube upon upward and downward movements of the cylinder. The lower portion of the hollow piston tube is swingably or turnably attached to a saddle fixed in the water. The cylinder has a cylinder chamber in its upper interior, and the cylinder chamber is communicated with the water suction part.

The wave pump having the above construction can utilize the wave energy to effectively convey the water and simplify its manufacturing process.

According to another aspect of the present invention, there is provided a wave pump actuated by the wave energy having a submerged water suction part for sucking a water into the wave pump and a water conveyance part for transmitting the sucked water to a certain place, characterized in that the wave pump further includes a hollow tiltable piston tube having a lower portion turnably attached to a stationary submerged saddle and communicated with the water conveyance part, an upper portion extending toward the water surface and a piston portion formed around a periphery of the upper portion, a cylinder fitted over the piston portion of the hollow piston tube such that it can slide up and down, a float provided at a top of the cylinder and supported between the cylinder top and a presser lid for moving the cylinder up and down by the wave energy, and valve means provided at the water suction and conveyance parts respectively for generating a flow of water in the hollow piston tube upon vertical movements of the cylinder. A cylinder chamber is defined in an upper interior of the cylinder and communicated with the water suction part.

With this structure, the float is detachable from the cylinder so that another float having a different height may replace the original float as desired.

According to still another aspect of the present invention, there is provided a wave pump actuated by the wave energy having a submerged water suction part for suction of a water and a water conveyance part for transmission of the sucked water, characterized in that the wave pump further includes a hollow tiltable piston tube having a lower portion turnably attached to a submerged fixed saddle and communicated with the water conveyance part, an upper portion extending toward the water surface and a piston portion formed over an outer periphery of the upper portion, a cylinder fitted over the piston portion of the hollow piston tube such that it can slide up and down, a cylindrical float transversely extending on a ceiling of the cylinder for causing the cylinder to move up and down by the wave energy, valve means provided at the water suction and conveyance parts respectively for generating a flow of water in the hollow piston tube upon vertical movements of the cylinder, and vent holes formed in an upper portion of the cylinder. A ceiling of the cylinder has an arc shape. A cylinder chamber is defined in an upper interior of the cylinder and communicated with the water suction part.

With this structure, bubbles in the cylinder are collected to the vent holes so that water suction and conveyance efficiencies would not be deteriorated by the bubbles.

According to yet another aspect of the present invention, there is provided a wave pump actuated by the wave energy having a submerged water suction part for water suction and a water conveyance part for water transmission, characterized in that the wave pump further includes a hollow tiltable piston tube having a lower portion turnably attached to a submerged stationary saddle and communicated with the water conveyance part, an upper portion extending toward the water surface and a piston portion formed on a periphery of the upper portion, a cylinder fitted over the piston portion of the hollow piston tube such that it can slide up and down and such that it defines a cylinder chamber in its upper interior, and an annular float spacedly arranged around the upper periphery of the cylinder for causing the cylinder to move up and down by the wave energy. The water suction part includes a water suction pipe connected to an upper periphery of the cylinder and extending downward between the outer periphery of the cylinder and an inner periphery of the float, the water conveyance part includes a water conveyance chamber connected to a lower end of the hollow piston tube such that it can tiltably support the hollow piston tube, and the water conveyance part further includes a water conveyance pipe connected with the water conveyance chamber. The wave pump further includes valve means provided on the water suction and conveyance pipes respectively for generating a flow of water in the hollow piston tube upon upward and downward movements of the cylinder.

With the wave pump having the above construction, the float and cylinder can be designed simply and rigidly. Further, a water suction height can be changed by simply adjusting a length of the water suction pipe. Different manners of water feeding according to applications are easily realized.

According to another aspect of the present invention, there is provided a wave pump actuated by the wave energy including a submerged water suction part for drawing a water into the wave pump and a water conveyance part for transmitting the drawn water to a desired place from the wave pump, characterized in that the wave pump further includes a hollow tiltable piston tube having a lower portion turnably attached to a submerged stationary saddle and connected with the water conveyance part, an upper portion extending toward the water surface and a piston portion formed around an outer periphery of the upper portion, a cylinder fitted over the piston portion of the hollow piston tube such that it can slide up and down and such that it defines a cylinder chamber in its upper interior, a float provided on the cylinder for causing the cylinder to move up and down by the wave energy, and valve means provided on the water suction and conveyance parts respectively for producing a flow of water in the hollow piston tube upon up and down movements of the cylinder. The water suction and conveyance parts are connected to a lower end of the hollow piston tube respectively.

With this construction, it is feasible to easily and effectively feed the water to a desired place by the wave pump having a simple structure.

According to another aspect of the present invention, there is provided a wave pump activated by a wave energy of a type including a submerged water suction part for drawing a water into the wave pump and a water discharge part for discharging the drawn water from the wave pump, comprising: a tiltable hollow piston tube having a lower portion and an upper portion, the lower portion being turnably connected to a submerged stationary saddle and communicated with the water suction part, the upper portion extending vertically upward toward a water surface, with a piston portion being formed over an outer periphery of the upper portion; a cylinder fitted over the piston portion of the hollow piston tube such that it can slide up and down, a cylinder chamber being defined in an upper interior of the cylinder; a float provided on the cylinder for moving the cylinder up and down using the wave energy; the water suction part being connected with a lower end of the hollow piston tube; the water discharge part being connected with an upper end of the cylinder, the water discharge part extending through the float; and valve means provided on the water suction and discharge parts respectively for generating a flow of water in the hollow piston tube upon upward and downward movements of the cylinder.

With this construction, the wave pump can possess a simple structure, easily and effectively draw the water into the water suction part and lift it for water discharge in the vicinity of the water surface from the water discharge part.

According to another aspect of the present invention, there is provided a wave pump activated by a wave energy including a submerged water suction part for drawing a water into the wave pump and a water discharge part for discharging the drawn water from the wave pump, comprising: a tiltable hollow piston tube having a lower portion and an upper portion, the lower portion being turnably connected to a submerged stationary saddle and communicated with the water suction part, the upper portion extending vertically upward toward a water surface, with a piston portion being formed on an outer periphery of the upper portion; a cylinder fitted over the piston portion of the hollow piston tube such that it can slide up and down, a cylinder chamber being defined in an upper interior of the cylinder and communicated with the water discharge part; a float provided on the cylinder for moving the cylinder up and down using the wave energy; the water suction part being connected with a lower end of the hollow piston tube; and valve means provided on the water suction and discharge parts respectively for generating a flow of water in the hollow piston tube upon upward and downward movements of the cylinder.

With this wave pump, it is feasible to raise the water from a lower layer of the water to the vicinity of the water surface in an easy and effective manner.

The valve means may include check valves provided on the water suction and conveyance parts respectively.

By these check valves, flowing back of the water from the water suction and conveyance parts is prevented. Accordingly, a particular direction of water flow is created in the hollow piston tube.

The piston portion of the hollow piston tube may be equipped with a buoy which exerts buoyancy to always maintain the hollow piston tube in a vertically standing posture.

By mounting the buoy onto the piston portion, the hollow piston tube is always directed vertically so that the wave energy can be effectively utilized.

In sum, the present invention can demonstrate the following outstanding advantages:

(1) It is possible to effectively utilize the wave energy in creating a flow of water in the submerged tube.

(2) It is possible to effectively convey the water from the vicinity of the water surface by the wave pump having a simple structure.

(3) By providing the water suction pipe in the float, water suction is carried out by very simple means in a stable manner.

(4) The float and cylinder can have simple and rigid structures respectively. Further, water suction height can be changed by simply changing the length of the water suction pipe.

(5) It is possible to effectively feed the water to a desired place such as a raising or cultivation facility from the bottom of the water.

(6) It is possible to easily and effectively lift the water to the vicinity of the water surface from the bottom of water by the wave pump having a simple structure.

(7) The float, cylinder and other parts can dodge a transverse force.

(8) It is possible to force the hollow piston tube to stand vertically by relatively simple means.

(9) By opening the hatch projecting upward from the float, passing a rope or wire through the hatch and lifting the hollow piston tube, it is possible to carry the apparatus by very simple means.

(10) By forcing the pressurized water into the hatch from the cylinder, the valve which is located at an inner lower portion of the hatch and designed to close by its weight can be firmly held down.

BRIEF DESCRIPTION OF THE ACCOMPANYING DRAWINGS

DETAILED DESCRIPTION OF THE PREFERRED EMBODIMENTS

Figure 1:
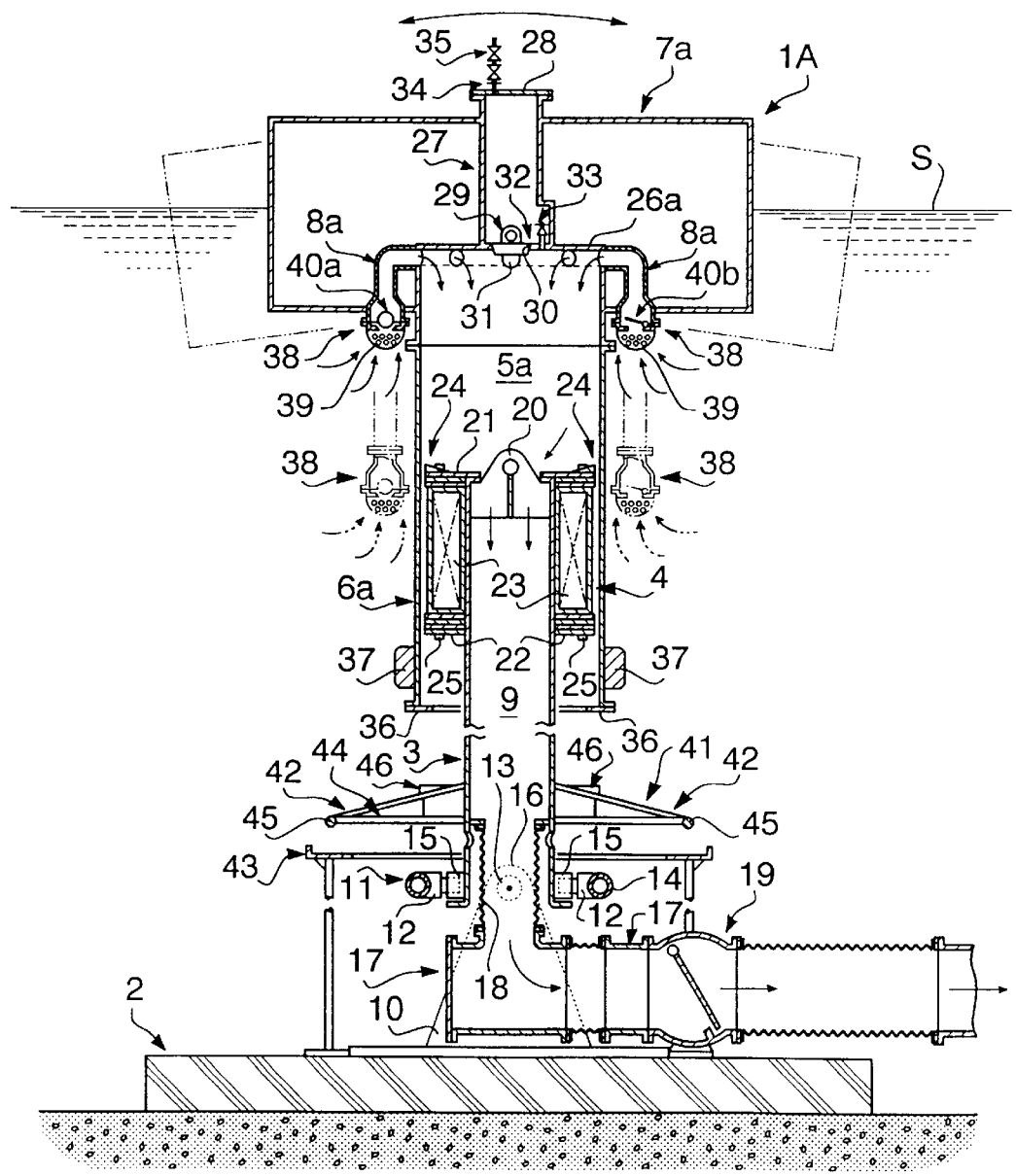
FIG. 1 is a vertical sectional view of a wave pump according to a preferred embodiment of the present invention.

Now, various preferred embodiments according to the present invention will be described with reference to the accompanying drawings. Like reference numerals are assigned to like parts in different drawings.

Referring to FIG. 1, a wave pump 1A is located on a base block 2 in an ocean or a closed water area such as a harbor.

The wave pump 1A includes a hollow piston tube 3 vertically extending toward the water surface S, a piston portion 4 formed around an upper outer portion of the piston tube 3, a cylinder 6a defining a cylinder chamber 5a above the piston portion 4, a float 7a firmly mounted at the top of the cylinder 6a, and a plurality of water suction pipes 8a for drawing a water into the cylinder chamber 5a from an upper layer of the water.

The hollow piston tube 3 is a tube shaped like a piston rod and has a water passage 9 in its inside for connecting the cylinder chamber 5a with a water conveyance tube 17. The hollow piston tube 3 has a lower portion which is connected with saddles 10 firmly fixed to the base block 2 via a universal joint mechanism 11 such that the hollow piston tube 3 is able to tilt.

The universal joint mechanism 11 has a ring member 14 defined by a ring around the hollow piston tube 3, a pair of opposed inner shafts 12 extending radially inward from the ring and a pair of opposed outer shafts 13 extending radially outward from the ring such that the inner and outer shafts form a crossing as viewed from the top. The inner shafts 12 projecting radially inward of the ring member 14 are journally supported by respective bearings 15 provided at a lower outer portion of the hollow piston tube 3, and the outer shafts 13 projecting radially outward of the ring member 14 are respectively supported by the saddles 10.

The saddles 10 are a pair of fixed supporting pedestals standing on the base block 2 and arranged to sandwich the ring member 14 at diametrically opposite positions. Each of the opposed saddles 10 has a bore 16 in its upper portion to journally support the associated outer shaft 13 of the ring member 14.

The bottom of the hollow piston tube 3 is connected with the water conveyance tube 17 extending along the bottom of the water via a flexible tube 18. The water conveyance tube 17 is equipped with a check valve 19 such that the water in the cylinder chamber 5a is only allowed to flow out of the hollow piston tube 3 or in the exit direction as indicated by the arrow.

A hanger element 20 is provided at the upper portion of the hollow piston tube 3 for hanging the hollow piston tube 3. The hanger element 20 has a "X" shape as viewed from the top and secured to an inner wall of the hollow piston tube 3. The hanger element is designed not to hinder the flow of water in the tube.

The piston portion 4 forms an enlarged diametrical portion of the hollow piston tube 3 at the upper portion of the piston tube and its height is approximately equal to a diameter of itself. The piston portion 4 is designed to smoothly reciprocate in the cylinder 6a. The piston portion 4 includes an upper segment 21, a lower segment 22 and a float segment 23 between the upper and lower segments 21 and 22, and buoyancy of the float segment 23 causes the hollow piston tube 3 to stand generally vertically.

A sharp cutter-like deposit removing device 24 is provided on an upper end face of the upper piston segment 21 to scratch off deposits from an inner wall of the cylinder 6a when it slides on the inner wall of the cylinder 6a. The deposit removing device 24, upper piston segment 21, float 23 and lower piston segment 22 are piled up and firmly clamped by tightening bolts 25 extending vertically through these parts so that they always form a single unit. Those portions of the float 23 which the clamping bolts 25 extend through have pipes (not shown) welded thereto so that the water does not enter the float 23.

The cylinder 6a has a vertical body with a ceiling 26a for sealing the top of the cylinder, and is fitted over the piston portion 4 such that it can slide up and down. A hatch 27 is provided at the center of the cylinder ceiling 26a for passage of a cord, rope, wire or the like. Such a wire is connectable with the hanger element 20 of the hollow piston tube 3 to hang or suspend the hollow piston tube 3.

The hatch 27 forms an elongated hole vertically extending through the ceiling 26a of the cylinder 6a, and its upper end projects over the float 7a. The upper end of the hatch 27 is closed by a detachable lid plate 28. The hatch has a valve 29 closed by its weight at its lower end. The valve 29 includes a valve seat 30 formed by reducing the diameter of an opening in the lower end of the hatch 27 and a heavy valve body 31 seated on the valve seat 30 for liquid tightly sealing the valve seat 30.

A bypass tube (passage) 32 communicated with the cylinder chamber 5a is formed near an inner lateral wall of the hatch 27, and a check valve 33 is provided on the bypass tube 32 for only allowing a flow of water toward the interior of the hatch from the cylinder chamber 5a. When the cylinder chamber 5a is filled with the water, the water is admitted to the hatch 27. The lid plate 28 has an air vent pipe 34 extending therethrough upward, and an automatic air vent valve 35 is provided on the air vent pipe 34 for only discharging the air to the atmosphere.

The cylinder 6a has a ring-shaped stopper 36 at its lower end. The inner diameter of the stopper 36 is smaller than the outer diameter of the piston portion 4 so that even if the float 7a moved up and down excessively or more than expected, the piston portion 4 would collide with the stopper 36 to prevent the cylinder 6a from falling off from the piston portion 4.

A weight 37 is attached to a lower outer wall of the cylinder 6a such that the cylinder 6a always takes a generally vertically standing posture.

The float 7a is a buoyant element firmly attached to the cylinder 6a in such a manner that it covers the top of the cylinder 6a and allows the hatch 27 to project. The float 7a is raised to the water surface S and caused to move up and down with up and down movements of the water surface S. By arranging the cylinder 6a having a relatively large weight but a relatively small buoyancy under the float 7a having a definite buoyancy, the center of buoyancy is positioned directly above the center of gravity and the cylinder 6a is maintained in a generally vertical posture.

The water suction tubes 8a extend radially outward from the upper lateral portion of the cylinder chamber 5a and bend downward at their mid points along the cylinder 6a. The water suction tubes 8a are incorporated in the float 7a. Downwardly directed water inlets 38 open at free ends of the water suction pipes 8a to pull in the upper layer water.

Each water inlet 38 is equipped with a suction strainer 39 and a check valve 40a or 40b. The strainers 39 are provided for rectifying the suction water and preventing invasion of foreign matters into the water suction pipes 8a. The strainers 39 are mounted to the water inlets 38. The check valves 40a or 40b are provided for only allowing the water to flow into the cylinder chamber 5a and positioned downstream of the associated strainers 39.

An inclination angle regulating/limiting device 41 is provided at a lower portion of the wave pump 1A to limit inclination of the hollow piston tube 3. The inclination angle regulation means 41 includes a stopper 42 extending radially outward from the lower portion of the hollow piston tube 3 and a saddle 43 for catching the stopper 42.

The stopper 42 includes a plurality of frames 44 radially extending from the hollow piston tube 3 and an annular contact member 45 fixed at free ends of the frames 44. When the hollow piston tube 3 tilts to a particular angle, the stop member 45 abuts the saddle 43 to prevent further inclination of the hollow piston tube 3. The stop member 45 is equipped with a cushion material such as a rubber (not shown) on its lower face so that shock exerted upon collision of the stop member 45 to the saddle 43 is absorbed.

The saddle 43 is a catch table secured on the base block 2 and has a ring shape which surrounds the outer periphery of the hollow piston tube 3. The saddle 43 is located at a position to collide with the stop member 45 when the hollow piston tube 3 inclines to a predetermined angle. That upper surface of the saddle 43 which collides with the stop member 45 is provided with a cushion material (not shown) such as a rubber in order to further absorb the shock upon collision of the stop member 45 with the upper surface of the saddle 43.

Stop saddles 46 are provided at an upper portion of the stopper 42 for receiving a lower end of the descending cylinder 6a. When the cylinder 6a moves down excessively, the stop saddles receive the stoppers 36 mounted to the lower end face of the cylinder 6a to prevent further downward movement of the cylinder 6a. The stop saddles 46 are also equipped with cushion members (not shown) such as rubber sheets on their upper surfaces.

Now, an operation will be described.

When the water surface S is raised by a wave, the float 7a buoyed up on the water surface S also moves up together with the rising water surface. Simultaneously, the cylinder 6a moves upward so that a volume of the cylinder chamber 5a defined in the cylinder 6a increases. Accordingly, the interior of the cylinder chamber 5a is expanded and a vacuum effect occurs. Because of this, the water pressure in the cylinder chamber 5a drops and the check valves 40a or 40b are opened. Consequently, the water comes into the cylinder chamber 5a through the strainers 39 and water pipes 8a. At this point, the check valve 19 is in a closed condition so that the water does not flow back into the hollow piston tube 3 from the water conveyance pipe 17.

As the wave ebbs and the water surface S lowers, the float 7a on the water surface S also lowers with the descending water surface S. At the same time, the cylinder 6a descends so that a compression force acts on the water in the cylinder chamber 5a thereby closing the check valves 40a or 40b. Then, the water in the cylinder chamber 5a is forced to the hollow piston tube 3 and the water in the hollow piston tube 3 is in turn imposed to the water conveyance pipe 17. Thus, the water pressure in the water conveyance pipe 17 rises and the check valve 19 is opened so that the water is conveyed to an intended place from the water conveyance pipe 17. During this operation, the check valves 40a or 40b at the water inlets are closed so that no water flows out of the cylinder chamber 5a from the water inlet pipes 8a.

It should be noted here that the wave pump may operate in a different manner if an accumulator or the like is provided downstream of the check valve 19 connected to the water conveyance pipe 17 and the water is transferred effectively using an inertia force of a fluid in the water conveyance pipe 17.

When the cylinder 6a moves downward, the inner wall of the cylinder 6a is scratched off by the deposit removal device 24 attached to the top of the piston portion 4. Therefore, depositions adhering on the inner wall of the cylinder 6a are scraped off. The scraped depositions fall in the hollow piston tube 3 and eventually flow into the water conveyance pipe 17. It should be noted that large depositions hardly adhere on the inner wall of the cylinder 6a since the cylinder 6a always moves up and down together with the wave and depositions do not exist in the sucked water.

When a transverse force is applied to the float 7a, cylinder 6a and hollow piston tube 3 by, for example, wave and wind, the hollow piston tube 3 tilts about the universal joint mechanism 11 to dodge about from the transverse force. If the hollow piston tube 3 is about to incline beyond the prescribed angle, the stopper 42 abuts the saddle 43 to prevent further inclination. Therefore, the ring member 14 does not hit the hollow piston tube 3 and the flexible tube 18 is not forced to extend or shrink beyond its limitation, which otherwise would damage the wave pump 1A. It should be noted that the float 7a may also be provided with cushion materials such as rubbers at appropriate locations for further safety.

If the water surface S descends excessively, the stopper 36 at the lower end of the cylinder 6a contacts the stop saddle 46 to regulate the lowering of the cylinder 6a. Therefore, the wave pump 1A would not be damaged due to excessive descending of the cylinder 6a.

As described above, the wave pump 1A is constructed as follows: the hollow piston tube 3 which has a lower portion communicated with the water conveyance pipe 17 equipped with the check valve 19 provided near the water bottom and which has an upper portion extending vertically toward the water surface S is tiltable, and the piston portion 4 is provided around the upper outer periphery of the hollow piston tube 3 with the cylinder 6a being fitted over the piston portion 4 such that the cylinder 6a is slidable in up and down directions for defining the cylinder chamber 5a above the piston portion. Further, the cylinder 6a is equipped with the float 7a to move the cylinder 6a upward and downward, and the water suction pipes 8a are connected with the cylinder 6a for drawing the water into the cylinder chamber 5a via the check valves 40a/40b. Consequently, it is possible to continuously and effectively transfer the water although the wave pump has a simple structure.

In addition, the lower end of the hollow piston tube 3 is tiltably coupled with the saddles 10 via the universal joint mechanism, the water conveyance pipe 17 is laid along the base block 2 which also supports the saddles 10, the hollow piston tube 3 and water conveyance pie 17 are connected with each other by the flexible tube 18, and the check valve 19 is provided on the water conveyance pipe 17. Therefore, it is feasible to make way for the transversal force exerted on the float 7a, cylinder 6a and other parts. Accordingly, no excessive force would not be applied to the wave pump 1A.

Since the sharp cutter-like deposit removal device 24 is provided on the upper end face of the piston portion 4, deposits on the inner wall of the cylinder 6a are automatically taken away using the wave energy. Therefore, no deposits would adhere on the cylinder 6a.

Since the piston portion 4 is comprised of the upper segment 21, lower segment 22 and float segment 23, and the lower portion of the hollow piston tube 3 extending below the piston portion 4 is pivotably supported by the universal joint unit 11, it is possible to allow the hollow piston tube 3 to stand generally vertically. Since the piston portion 4 has an elongated height which is approximately equal to the diameter of the piston portion, it is possible to allow the piston portion 4 to smoothly reciprocate relative to the cylinder 6a inside the cylinder 6a.

Since the water passage 9 is formed inside the hollow piston tube 3 and the water is admitted to a lower area in the water passage 9 from the cylinder chamber 5a for conveyance, compression and vacuum to the water in the cylinder chamber 5a caused by up and down movements of the float 7a do not entirely act on the hollow piston tube 3 even if the up and down movements of the float 7a cause the water in the cylinder chamber 5a to be repeatedly subjected to compression and vacuum: rather the compression and vacuum act on the water in the water passage 9 and are converted to an energy to convey the water to the water conveyance pipe 17 from the water inlet pipes 8a. Therefore, longevity of the hollow piston tube 3 is considerably elongated.

Because the water inlet pipes 8a are incorporated in the float 7a, stable water suction is achieved with a very simple means.

The openable/closable hatch 27 is provided at the top of the cylinder 6a. Therefore, by opening the hatch 27, passing a wire or rope and hanging the hollow piston tube 3, the apparatus can be relocated by a very simple means.

Because the hatch 27 is provided with the bypass tube 32 having the check valve 33, it is possible to force the compressed water into the hatch 27 from the cylinder 6a thereby firmly pressing the valve 29 of the hatch 27.

Another embodiment of the present invention will be described with reference to the accompanying drawing.

Figure 2:
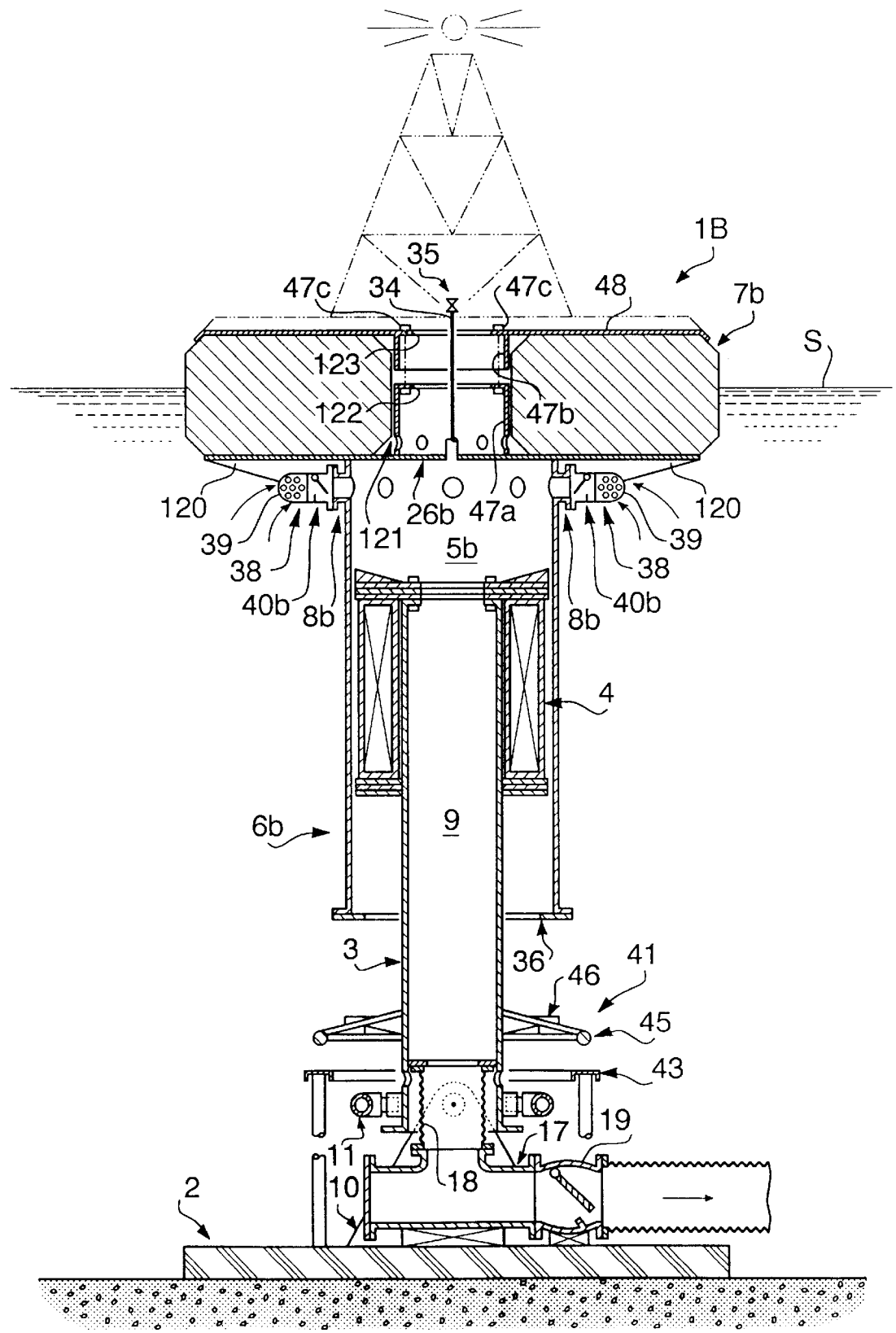
FIG. 2 is a vertical sectional view of another wave pump according to the present invention (second embodiment)

A wave pump 1B illustrated in FIG. 2 is a modification of that illustrated in FIG. 1. Specifically, the cylinder 6a, water inlet parts (water inlets 38, suction strainers 39 and check valves 40a/40b) and float 7a of FIG. 1 are modified. Other parts are substantially mutual with FIG. 1.

A float 7b of the wave pump 1B has a generally annular shape and is secured on a cylinder 6b (will be described).

The cylinder 6b has a vertically extending cylindrical body having a closed ceiling 26b at its upper end. An air vent pipe 34 is provided at an approximate center of the ceiling 26b, and an automatic air vent valve 35 is provided at an upper end thereof. The ceiling 26b radially extends beyond the cylinder 6b, and support members such as ribs 120 are provided between that portion of the ceiling 26b which projects from the cylinder 6b and the cylinder 6b itself to prevent deformation of the ceiling 27b.

A first holding pipe 47a stands from a center area of an upper surface of the ceiling 26b for supporting the float 7b. The first holding pipe 47a has an outer diameter which can be inserted into a bore 121 formed through the center portion of the float 7b. By fitting the first holding pipe 47a into the bore 121, the float 7b is regulated in its horizontal movement. A first flange 122 extends radially inward from an upper end periphery of the first holding pipe 47a for engagement with clamping bolts 47c.

A presser lid 48 is provided on the float 7b for securing the float 7b by clamping. The lid 48 is an annular plate and has an outer diameter substantially equal to the outer diameter of the float 7b. A second holding pipe 47b having the same diameter as the first holding pipe 47a extends vertically downward from the center of the lid 48 and is also fitted in the bore 121 of the float 7b.

The second holding pipe 47b has a second flange 123 extending radially inward from the upper end periphery thereof for engagement with the clamping bolts 47c. By extending the clamping bolts 47c through the first and second flanges 122 and 123 and tightening them, the float 7b is clamped and fixed by the presser lid 48 and ceiling 26b.

An outer periphery of the pressure lid 48 is bent downward to conform with the shape of the float 7b thereby reliably holding the float 7b.

Water suction pipes 8b extend radially outward from an upper portion of the cylinder 6b so that they extend radiantly as viewed from the top. Suction strainers 39 are provided at free ends of the water suction pipes 8b to form water inlets 38 respectively. The water suction pipes 8b are also equipped with check valves 40b at their mid points for only allowing the water to flow in drawing directions respectively such that the water in the cylinder chamber 5b does not flow back toward the water inlet pipes 8b.

An operation of this wave pump will now be described.

In order to secure the float 7b onto the cylinder 6b, the float 7b is first placed on the ceiling 26b and the presser lid 48 is piled up on the float 7b. Then, the first and second holding pipes 47a and 47b are firmly tightened by the clamping bolts 47c. As a result, the float 7b is securely fixed on the ceiling 26b, and the float 7b and cylinder 6b are substantially united so that they quickly respond to upward and downward movements of the wave.

In this manner, since the float 7b is secured on the cylinder 6b by clamping the presser lid 48, the float 7b is detachable from the cylinder 6b. Accordingly, a float having a different height may be employed depending upon applications.

Still another embodiment will be described with reference to the accompanying drawing.

Figure 3:
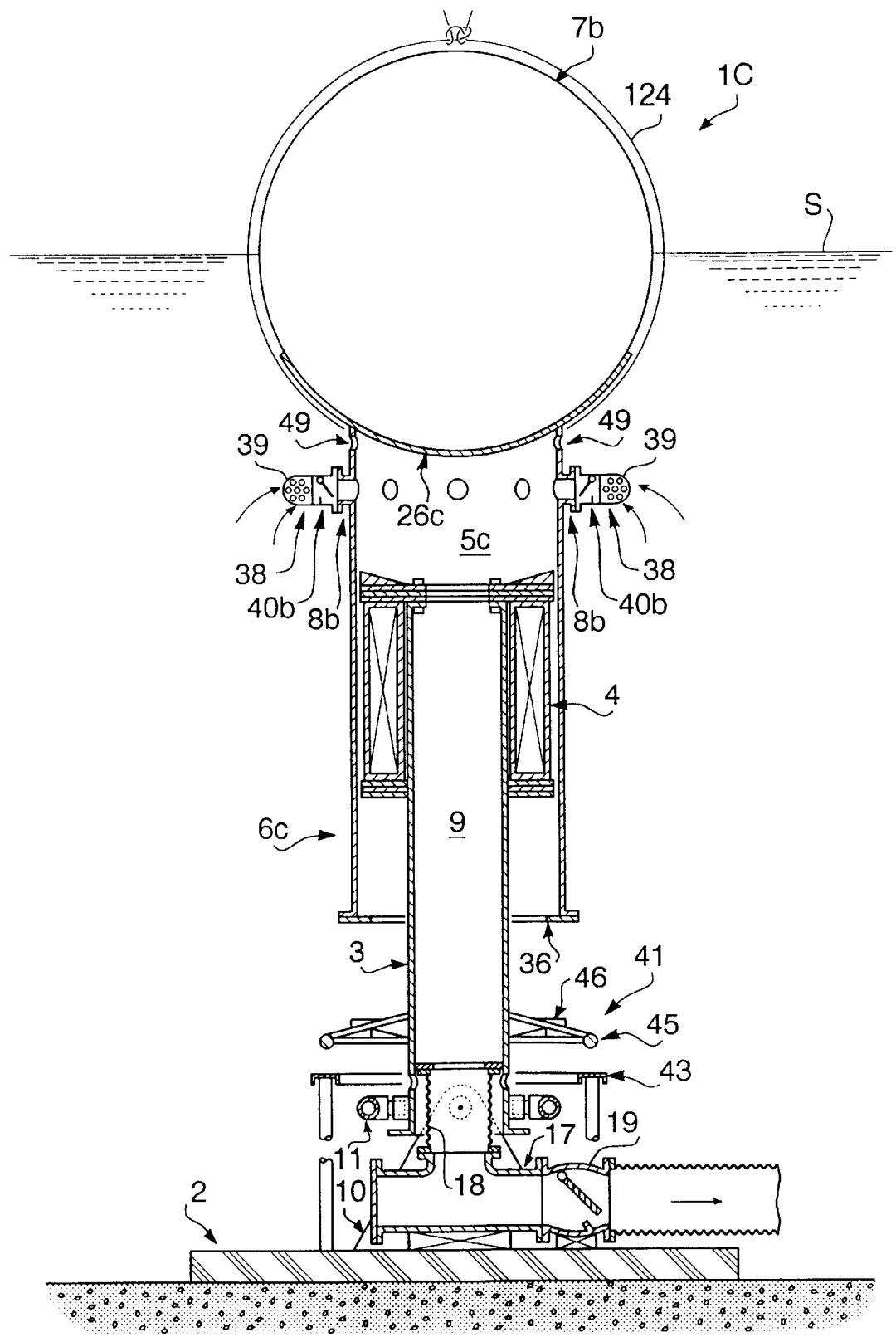
FIG. 3 is a sectional view of still another wave pump according to the present invention (third embodiment)

A wave pump 1C illustrated in FIG. 3 includes modifications to the cylinder 6b and float 7b of the wave pump 1B shown in FIG. 2. Other parts are generally common to those of the previous embodiments.

A ceiling 26c is formed at an upper end of a cylinder 6c as a part of the cylinder 6c, and a generally cylindrical float 7c is secured on the ceiling 26c.

The ceiling 26c has an arc shape to conform with a lower portion of the float 7c. Vent holes 49 are formed in a wall of the cylinder 6c near right and left upper ends of the cylinder 6c to allow bubbles to escape to the outside from the cylinder 6c.

The float 7c and ceiling 26c are firmly tightened by a cord member 124 such as a wire, rope, chain or band for unifying.

The water suction pipes 8b and associated strainers 39 are the same as those of the wave pump 1B shown in FIG. 2.

Now, an operation of this wave pump will be described.

When bubbles enter the cylinder, they are collected to the sides having the vent holes 49 as guided by the ceiling 26c. When a water surface S descends and the volume of a cylinder chamber 5c is reduced, the bubbles are forced out of the cylinder 6c from the vent holes 49.

In this manner, the bubbles which have entered the cylinder chamber 5c are quickly forced out of the cylinder 6c. Therefore, the bubbles would not be accumulated or confined in the cylinder chamber 5c which would otherwise greatly deteriorate pump functions/performances.

When the cylinder 6c moves up and down to draw the water into the cylinder chamber 5c and feed the water from the cylinder chamber 5c, some water may come in and out through the vent holes 49. However, the vent holes are designed to have a sufficiently small diameter relative to the size of the apparatus (wave pump) so that an amount of water coming in and out through the vent holes 49 is very minute and a pump efficiency is not affected.

As described above, the ceiling 26c is bent to collect the bubbles to the particular sides of the cylinder 6c and the vent holes 49 are formed at the upper end of the cylinder 6c so that the bubbles are gathered to the vent holes 49 and forced out of the cylinder 6c from the vent holes 49. Consequently, it is possible to avoid a fatal damage to a piston pump that the bubbles are confined in the cylinder 6c to disable water drawing and transferring.

Yet another embodiment of the present invention will be described.

Figure 4:
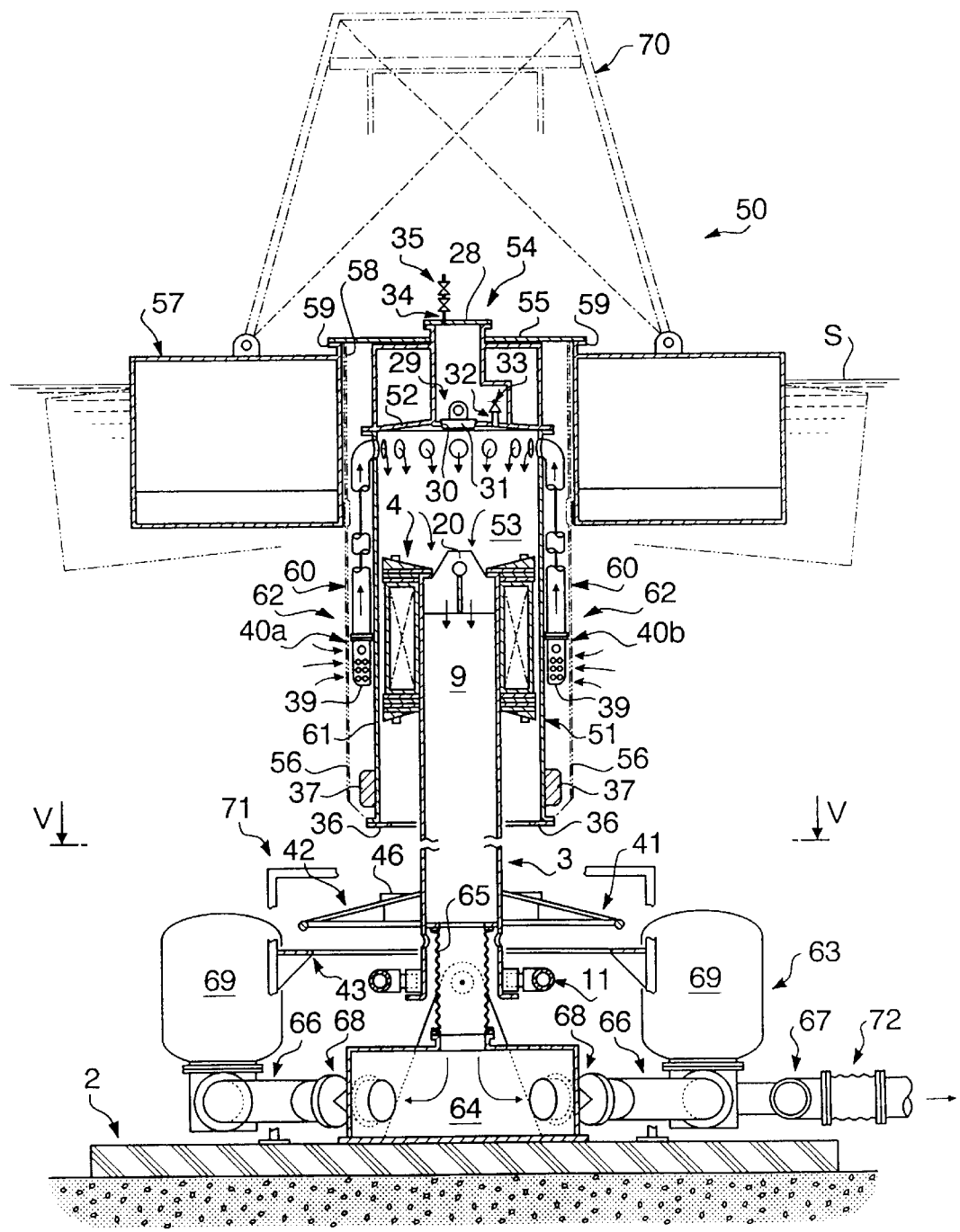
FIG. 4 is a sectional view of a wave pump according to a fourth embodiment of the invention.

A wave pump 50 depicted in FIG. 4 includes modifications to the cylinder 6a, float 7a, water inlet pipes 8a and water feeding parts (water conveyance pipe 17, flexible tube 18 and check valve 19) of the wave pump 1A shown in FIG. 1. This wave pump is placed on a center of a base block 2 having a generally rectangular shape as viewed from the top.

A cylinder 51 includes a vertically extending cylindrical body and a closed ceiling 52 at its upper end, and is slidably fitted over a piston portion 4. The ceiling 52 has a gentle inclination to define a peak at its center so that bubbles in a cylinder chamber 53 are gathered to the center of the ceiling 52. A hatch 54 is provided at the center of the ceiling 52 for suspending a cord therethrough to hang a hanger 20 of a hollow piston tube 3.

The hatch 54 defines an elongated hole vertically extending through the ceiling 52 of the cylinder 51, with its upper end being closed by a detachable lid plate 28 and its lower end being equipped with a valve 29 which closes by its weight. The valve 29 includes a valve seat 30 formed at a lower end of the hatch 54 and a valve body 31 seated on the valve seat 30. A bypass pipe 32 having a check valve 33 is provided along an inner wall of the hatch 54, and an air vent pipe 34 having an automatic air vent valve 35 is provided on the lid plate 28. A horizontally extending flange-like mounting plate 55 is provided at a vertical midpoint of the hatch 54 such that it projects radially outward of the cylinder 51, and a float 57 is secured on the cylinder 51 via the mounting plate 55.

A plurality of parallel guide rails 56 are provided on an outer surface of the cylinder 51 such that the guide rails extend from an upper end of the cylinder 51 to the vicinity of a lower end of the cylinder. These guide rails 56 are provided for guiding the cylinder 51 moving up and down in the float 57 floating on a water surface S when the cylinder 51 is lifted up to hoist the apparatus after removing the float 57 from the cylinder 51. The guide rails are sufficiently and firmly fixed on the cylinder 51.

The float 57 has a generally annular configuration and its inner wall 58 surrounds an outer surface of the cylinder 51 with a predetermined gap. The inner wall 58 of the float 57 has guide portions (not shown) which move up and down along the guide rails 56 so that the float can be smoothly lifted up and down along the cylinder 51. The float 57 has a contact plate 59 rolled up outwardly along its inner upper edge so that falling off of the float 57 from the upper end of the cylinder 51 is prevented by the contact plate 59 abutting to the mounting plate 55 of the cylinder 51. The contact plate 59 is firmly secured on the mounting plate 55 by bolts or the like (not shown) during operation.

Water suction pipes 60 are radiantly connected to the upper outer periphery of the cylinder chamber 53. The water suction pipes 60 bend downward immediately from their connections to the cylinder chamber and extend along an outer surface 61 of the cylinder 51. The water suction pipes 60 are positioned radially inward of the guide rails 56 and extend in a gap between the outer surface 61 of the cylinder 51 and the inner surface 58 of the float 57 such that they do not contact the float 57. At free ends of the water suction pipes 60, provided are water inlets 62 equipped with suction strainers 39 and check valves 40*a*/40*b* respectively.

Figure 5:
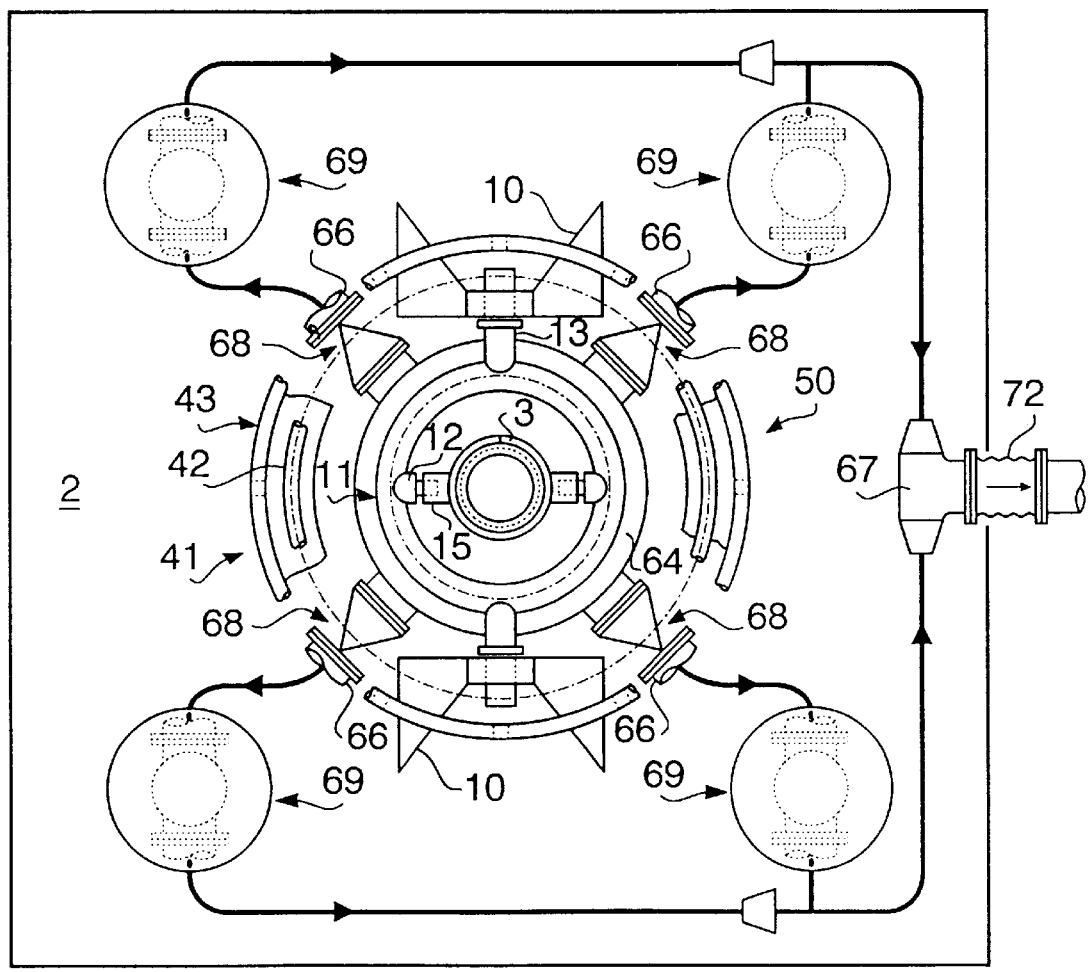
FIG. 5 is a sectional view taken along the V—V line.

As illustrated in FIGS. 4 and 5, a series of water conveyance parts 63 includes a water feed chamber 64 fixed at an approximate center of the base block 2, a flexible tube 65 pivotably connecting the hollow piston tube 3 with the water feed chamber 64, four water conveyance pipes 66 branched radiantly from the water feed chamber 64 along the base block 2, and a convergent pipe 46 gathering the conveyance pipes 66.

Each water conveyance pipe 66 is equipped with a check valve 68 and an accumulator 69 downstream of the check valve 68 for rectifying a fluctuating flow of water conveyed from the hollow piston tube 3 to a smoothed flow of water. There are four accumulators 69 fixedly arranged on the base block 2 at four corners of the base block in a symmetric manner as viewed from the top.

An upstream end of the convergent pipe 67 is positioned above the base block 2, and the convergent pipe 67 extends outward of the base block 2. The convergent pipe 67 includes a flexible pipe 72 at its midpoint such that an error in an installation position is tolerated for easier installation work and such that expansion and shrinkage of the pipe due to water temperature change and the like are absorbed.

An operation of this embodiment will now be described.

When the float 57 moves upward with movement of the water surface S, this upward movement is transmitted to the mounting plate 55 of the cylinder 51 from the contact plate 59 of the float 57 so that the cylinder 51 is raised upward. In this situation, the hatch 54 is filled with the water so that a back pressure acts on the valve body 31 and a negative pressure applies inside the cylinder chamber 53. Thus, the valve 29 does not move unintentionally. When the float 57 moves downward, the cylinder 51 is imposed to descend by the float 57. If the water pressure in the cylinder chamber 53 becomes greater than that in the hatch 54, the water in the cylinder chamber 53 enters the hatch 54 through the bypass pipe 32 and check valve 33 thereby raising the water pressure in the hatch 54 and raising the back pressure acting on the valve body 31. Consequently, the valve 29 does not open. Even if bubbles enter the hatch 54, they are discharged to the outside from the air vent pipe 34 and automatic air vent valve 35.

When the wave pump 50 is carried to a remote place, a temporary frame 70 is attached to an upper surface of the float 57 to extend over the cylinder 51, and an electric winch (not shown) is mounted to the frame 70 above the cylinder 51 for lifting up the hollow piston tube 3. Then, another frame 71 is mounted over the saddle 43, and a cushion material such as a rubber plate (not shown) is attached to an upper surface of the frame 71, which cushion material will contact a lower surface of the float 57. It should be noted here that the frame 71 may not be provided and a stopper 36 attached to a lower end face of the cylinder 51 may directly abut a stop saddle 46 of the cylinder 51 if a particular design is employed to the wave pump.

Next, an air is injected into the accumulators 69 to force the water out and yield buoyancy. Then, the lid plate 28 is removed from the hatch 54 and the valve body 31 is lifted up from the valve seat 30. At this point, the pressure in the cylinder chamber 53 first becomes a non-load condition (or neutral condition). After that, the bolts clamping the contact plate 59 of the float 47 with the mounting plate 55 provided at the upper end face of the cylinder 51 are unscrewed.

Then, a cord (not shown) is unwound from the electric winch into the hatch 54. After a hook at a free end of the cord is engaged with the hanging element 20, the electric winch is activated to lift the hollow piston tube 3. At this point, since the wave pump 50 is located at an approximate center of the base block 2 and the accumulators 69 are symmetrically arranged on the base block 2 at four corners thereof as viewed from the top, the wave pump 50 is moved up while maintaining the posture of when it is first installed.

When the piston portion 4 and hollow piston tube 3 are lifted up in the cylinder 51 and the carriage frame 71 abuts the stopper 36 provided at the lower end face of the cylinder 51, a lower end portion of the cylinder 51 is temporarily clamped to the carriage frame 71 by a suitable device such as a vice. Then, the electric winch is further activated for winding the rope/wire such that the cylinder 51 is raised to the highest point. At the same time, the cylinder 51 gradually separates the mounting plate 55 from the contact plate 59 of the float 57. During this operation, the cylinder 51 contacts the float 57 via the guide rails 56 so that the water suction pipes 60 do not collide with the float 57.

After confirming a minimum water depth for carriage and other necessary conditions, a fixing support member and associated parts (not shown) are inserted between the contact plate 59 provided at the top of the float 57 and the mounting plate 55 provided at the top of the cylinder 51 to unite and carry them.

In this manner, the annular float 57 is spacedly connected with the cylinder 51, the water inlet tubes 60 are connected with the cylinder 51 for drawing the water in the cylinder chamber 53 via the check valves 40*a*/40*b*, and the water inlet tubes 60 are elongated downward in the gap between the cylinder 51 and annular float 57. Consequently, the float 57 and cylinder 51 can have a simple but rigid structure. Further, a water suction height can be changed by simply varying the length of the water suction pipe 60. In other words, different manners of water feeding are easily achieved according to applications.

Since the accumulators 66 are coupled to the water conveyance tubes 66, a fluctuating flow of water fed from the hollow piston tube 3 is rectified and a smoothed flow of water is obtained.

Yet another embodiment of the present invention will be described with reference to the accompanying drawing.

Figure 6:
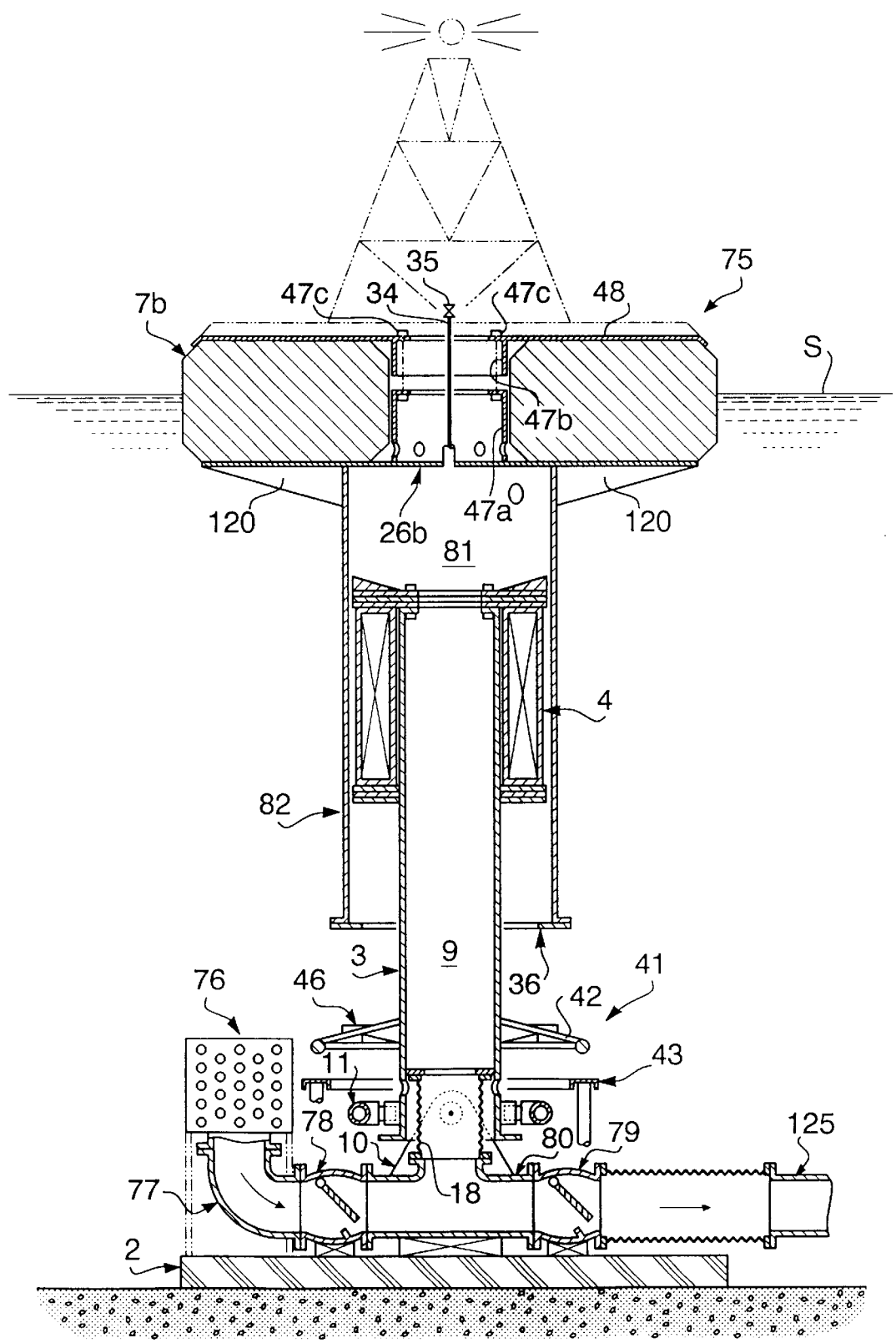
FIG. 6 is a sectional view of a wave pump according to a fifth embodiment of the present invention.

As illustrated in FIG. 6, a wave pump 75 has a water suction pipe 77 extending near a bottom of the water to draw in a water from a lower layer of the water. The wave pump 75 also conveys the sucked water to a desired place.

The wave pump 75 includes an intermediate pipe 80 connecting the water suction pipe 77 with a water conveyance pipe 125, a hollow piston tube 3 extending vertically upward from the connection pipe 80 toward the water surface S, a piston portion 4 attached around an upper outer wall of the hollow piston tube 3, a cylinder 82 for defining a cylinder chamber 81 above the piston portion 4, and a float 7b (same as that of the wave pump 1B shown in FIG. 2) secured on an upper end face of the cylinder 82.

The water inlet pipe 77 is laid near the bottom of the water and communicated with the lower end of the hollow piston tube 3. The water inlet pipe 77 is equipped with a check valve 78 at its midpoint for only allowing the water to flow toward the connection pipe 80 and hollow piston tube 3. A free end portion of the water suction pipe 77 is bent upward and a suction strainer 76 is provided at the end of the water suction pipe 77.

The hollow piston tube 3 is a piston rod-like tube, and includes a water passage 9 connecting the cylinder chamber 81 with the connection pipe 80. The hollow piston tube 3 is tiltably supported by saddles 10 via a universal joint mechanism 11, and the lower end of the hollow piston tube 3 is connected with a midpoint of the connection pipe 80 lying along the water bottom via the flexible pipe 18.

An air vent pipe 34 and automatic air vent valve 35 are provided on a ceiling 26b extending as an upper end surface of the cylinder 82.

An inclination angle regulation device 41 is provided at a lower portion of the wave pump 75. The inclination angle regulation device 41 includes a stopper 42 mounted to a lower portion of the hollow piston tube 3 and a regulation saddle 43 fixed on a base block 2 for receiving the stopper 42.

Next, an operation of this wave pump will be described.

When the water surface S rises due to the wave, the float 7b and cylinder 82 ascend together so that the interior of the cylinder chamber 81 is expanded thereby causing a vacuum effect. As a result, the water pressure in the cylinder chamber 81 drops, the check valve 78 opens, and the water in the lower layer flows into the water passage 9 of the hollow piston tube 3 through the strainer 76 and water suction pipe 77. The water in the water passage 9 eventually enters the cylinder chamber 81. During this operation, a check valve 79 is maintained in a closed condition so that the water does not flow back from the water conveyance pipe 125.

When the water surface S moves downward, the float 7b and cylinder 82 are also lowered and a compression force is applied to the water in the cylinder chamber 81 thereby closing the check valve 78.

The water pressure in the cylinder chamber 81 rises and the check valve 79 opens for conveyance of the water. During this operation, the check valve 78 is in a closed condition and the water does not flow back from the cylinder chamber 81 to the water suction pipe 77.

As described above, the lower end of the wave pump is connected to the check valve 78 for water suction and the check valve 79 for water conveyance, both positioned near the bottom of the water. Further, the upper portion of the wave pump is constituted by the tiltable hollow piston tube 3 extending vertically upward toward the water surface, the piston portion 4 mounted to the upper outer surface of the hollow piston tube 3, the cylinder 82 slidably fitted over the piston portion 4 to define the cylinder chamber 81 above the piston portion 4 and the float 7b provided on the cylinder 82 for moving the cylinder 82 up and down. Therefore, it is possible to effectively and easily feed the water to a desired place with a simple construction.

Still another embodiment of the present invention will be described with reference to the accompanying drawing.

Figure 7:
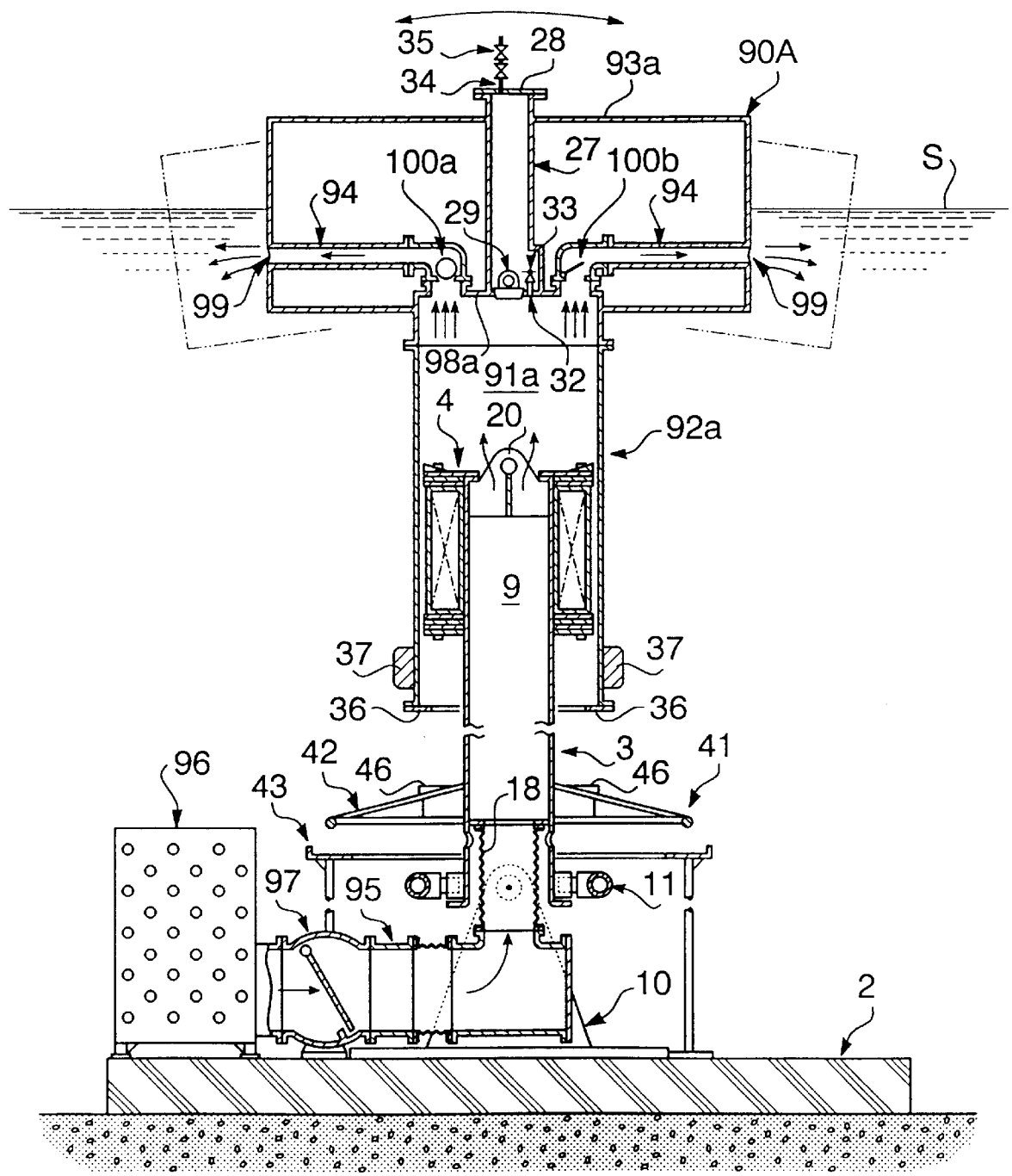
FIG. 7 is a sectional view of a wave pump according to a sixth embodiment of the present invention.

As illustrated in FIG. 7, a wave pump 90A is a pump for pulling up the water from the lower layer of the water (water near the bottom of the water) to mix the lower layer water with an upper layer water near the water surface S. The wave pump 90A includes a hollow piston tube 3 standing toward the water surface S, a piston portion 4 mounted to the upper outer surface of the hollow piston tube 3, a cylinder 92a for defining a cylinder chamber 91a above the piston portion 4, a float 93a secured on an upper end of the cylinder 92a, and water discharge pipes 94 for feeding the lower layer water to the vicinity of the water surface S from the cylinder chamber 91a.

The hollow piston tube 3 has a piston rod-like configuration and defines a water passage 9 therein for connecting the cylinder chamber 91a with a water suction pipe 95 (will be described later). The hollow piston tube 3 is inclinably supported by saddles 10 via a universal joint mechanism 11, and a lower end of the hollow piston tube 3 is connected to the water suction pipe 95 laid on the water bottom by a flexible pipe 18.

A suction strainer unit 96 is provided at a free end of the water inlet pipe 95, and a check valve 97 is provided downstream of the suction strainer 96 for only allowing the water to flow to the hollow piston tube 3. The suction strainer 96 rectifies a flow of water sucked into the water inlet pipe 95 and also prevents entry of foreign matters into the water inlet pipe 95. The suction strainer 96 is united to the water inlet pipe 95.

A hanger 20 is attached to a top of the hollow piston tube 3.

The cylinder 92a has a vertical cylindrical body with its upper end being closed by a ceiling 98a. The cylinder 92a is fitted over the piston portion 4 such that it can slide up and down. A hatch 27 is provided at the center of the ceiling 98a. An upper end of the hatch 27 is closed by a removable lid plate 28 and a lower end of the hatch is equipped with a valve 29 which closes by its weight.

A bypass pipe 32 communicated with the cylinder chamber 91a is provided in the hatch 27, and a check valve 33 is provided on the bypass pipe 32 for only admitting a flow of water from the cylinder chamber 91a. The lid plate 28 has an air vent pipe 34 extending upward therethrough, and an automatic air vent valve 35 is provided on the air vent pipe 34 for only discharging the air to the atmosphere.

A stopper 36 is attached to a lower end face of the cylinder 92a and a weight 37 is attached to a lower outer surface of the cylinder 92a.

The float 93a is a buoy provided on the cylinder 92a to cover the top of the cylinder 92a and to allow the hatch 27 to project upward. The float 93a floats on the water surface S and moves up and down upon up and down movements of the water surface S.

The water discharge pipes 94 extend upward from the ceiling 98a and soon bend in radially outward directions. These pipes therefore extend radiantly as viewed from the top. The water discharge pipes 94 are incorporated in the float 93*a*. Horizontally directed discharge outlets 99 open at free ends of the water discharge pipes 94 respectively. The water discharge openings 99 are positioned under or level with the water surface S. It should be noted that a certain measure is taken to the water discharge openings 99 to prevent invasion of foreign matters.

Near the ceiling 98*a* of the cylinder 92*a*, provided are check valves 100*a* and 100*b* for only allowing the water to flow out of the cylinder chamber 91*a* so that the upper layer water (water near the water surface S) does not flow back into the cylinder chamber 91*a*.

The wave pump 90A includes an inclination angle regulation device 41 at its lower portion. The inclination angle regulation device 41 includes a stopper 42 provided at a lower outer portion of the hollow piston tube 3 and a saddle 43 secured on a base block 2 for receiving the stopper 42. The stopper 42 has a stop saddle 46 at its upper portion to catch the stopper 36 provided at the lower end of the cylinder 92*a* thereby stopping further downward movement of the cylinder 92*a*. The stop saddle 46 is also provided with a shock absorbing material such as a rubber sheet (not shown) at its upper surface.

An operation of this embodiment will now be described.

As the water surface S is raised by the wave, the float 93*a* and cylinder 92*a* are also raised and the inside of the cylinder chamber 91*a* is expanded causing a vacuum effect. Consequently, the water pressure in the cylinder chamber 91*a* is lowered and the check valve 97 is opened whereby the water from the lower layer of the water is allowed to enter the hollow piston tube 3 and cylinder chamber 91*a* from the suction strainer 96 and water suction pipe 95. At this point, the check valves 100*a* and 100*b* for water discharge are both closed so that the water does not flow back into the hollow piston tube 3 from the water discharge pipes 94.

When the water surface S descends, the float 93*a* and cylinder 92*a* also descend and a compression force applies to the water in the cylinder chamber 91*a* thereby closing the check valve 97. Then, the water pressure in the cylinder chamber 91*a* is raised and the check valves 100*a* and 100*b* are opened so that the water is discharged to the vicinity of the water surface S from the discharge pipes 94. Because the discharge openings 99 are below or level to the water surface S, there is no loss due to a head difference and the hollow piston tube 3 does not move up and down so that stable water conveyance is carried out. In addition, because the check valve 97 is closed during this operation, the water does not flow out of the cylinder chamber 91*a* from the water suction pipe 95.

It should be noted that if accumulators or the like are provided downstream of the check valves 100*a* and 100*b* of the water discharge pipes 94 to effectively utilize an inertia force of a fluid in the water discharge pipes 94 for water conveyance as does the wave pump 1A shown in FIG. 1, the wave pump may operate in a manner different.

As described above, the wave pump 90A is constructed as follows: the lower end of the wave pump is communicated with the water suction pipe 95 equipped with the check valve 97 located near the water bottom, and the upper portion of the wave pump is constituted by the tiltable hollow piston tube 3 vertically extending toward the water surface S, the piston portion 4 attached to the upper outer surface of the hollow piston tube 3, the cylinder 92*a* slidably fitted over the piston portion 4 to define the cylinder chamber 91*a* above the piston portion 4, the float 93*a* mounted on the cylinder 92*a* for moving the cylinder 92*a* up and down and the water discharge pipes 94 connected with the cylinder 92*a* for feeding the lower layer water to the upper layer of the water from the cylinder chamber 91*a* via the check valves 100*a* and 100*b*. Therefore, it is feasible to easily and effectively pull up the water from the lower layer of the water to the water surface S with the wave pump having a simple structure.

Since the water discharge openings 99 are positioned to be level to or below the water surface S, there is no loss due to a head difference and a large amount of lower layer water can be mixed with the upper layer water in an effective and stable manner.

Since the hollow piston tube 3 is connected with the base block 2 via the universal joint mechanism 11 and saddles 10, the hollow piston tube 3 does not move up and down. Thus, upward and downward movements of the cylinder 92*a* are effectively utilized so that a large amount of lower layer water can be blended with the upper layer water effectively and stably.

Another embodiment of the present invention will be described with the accompanying drawing.

Figure 8:
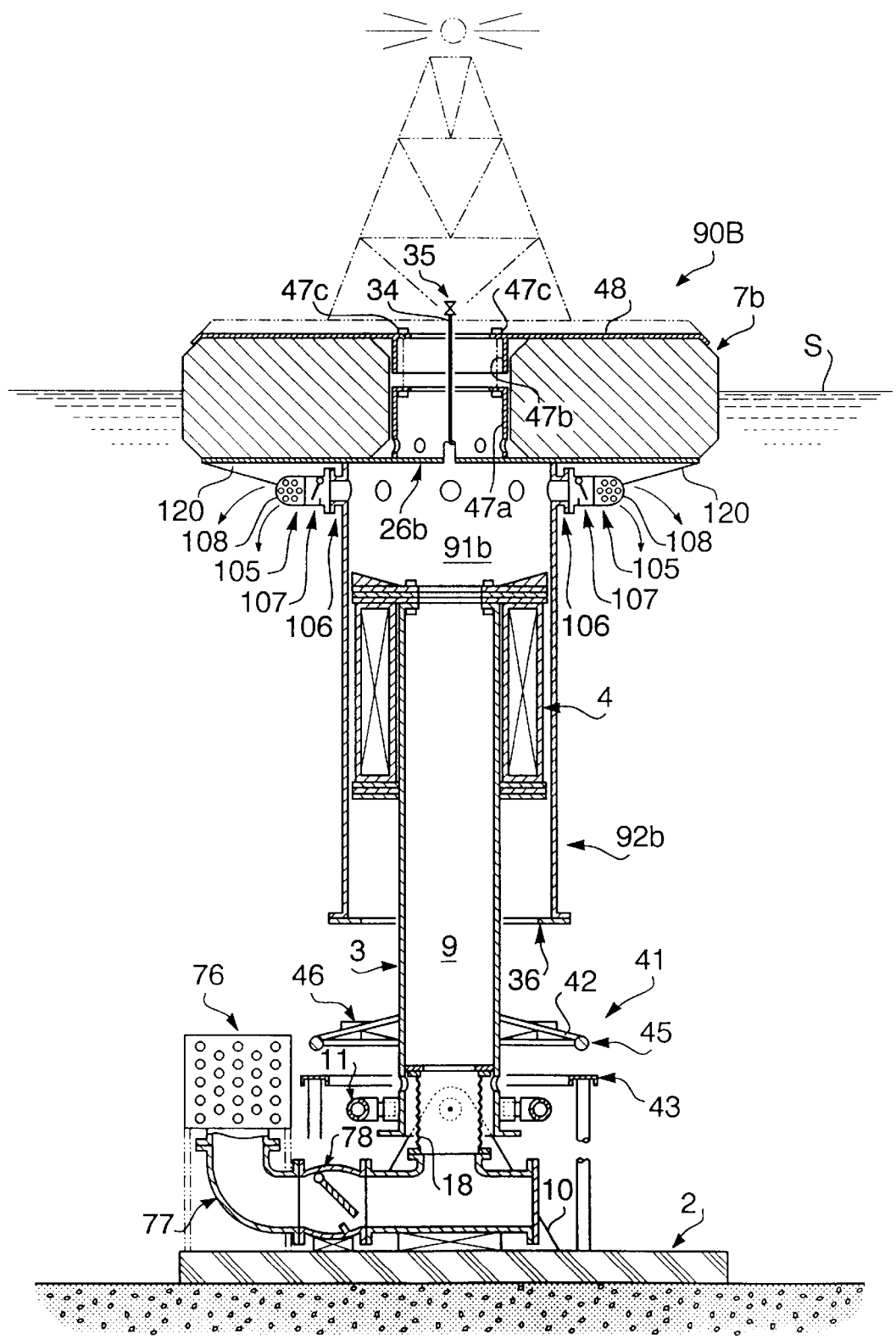
FIG. 8 is a sectional view of a wave pump according to a seventh embodiment of the present invention.
Figure 9:
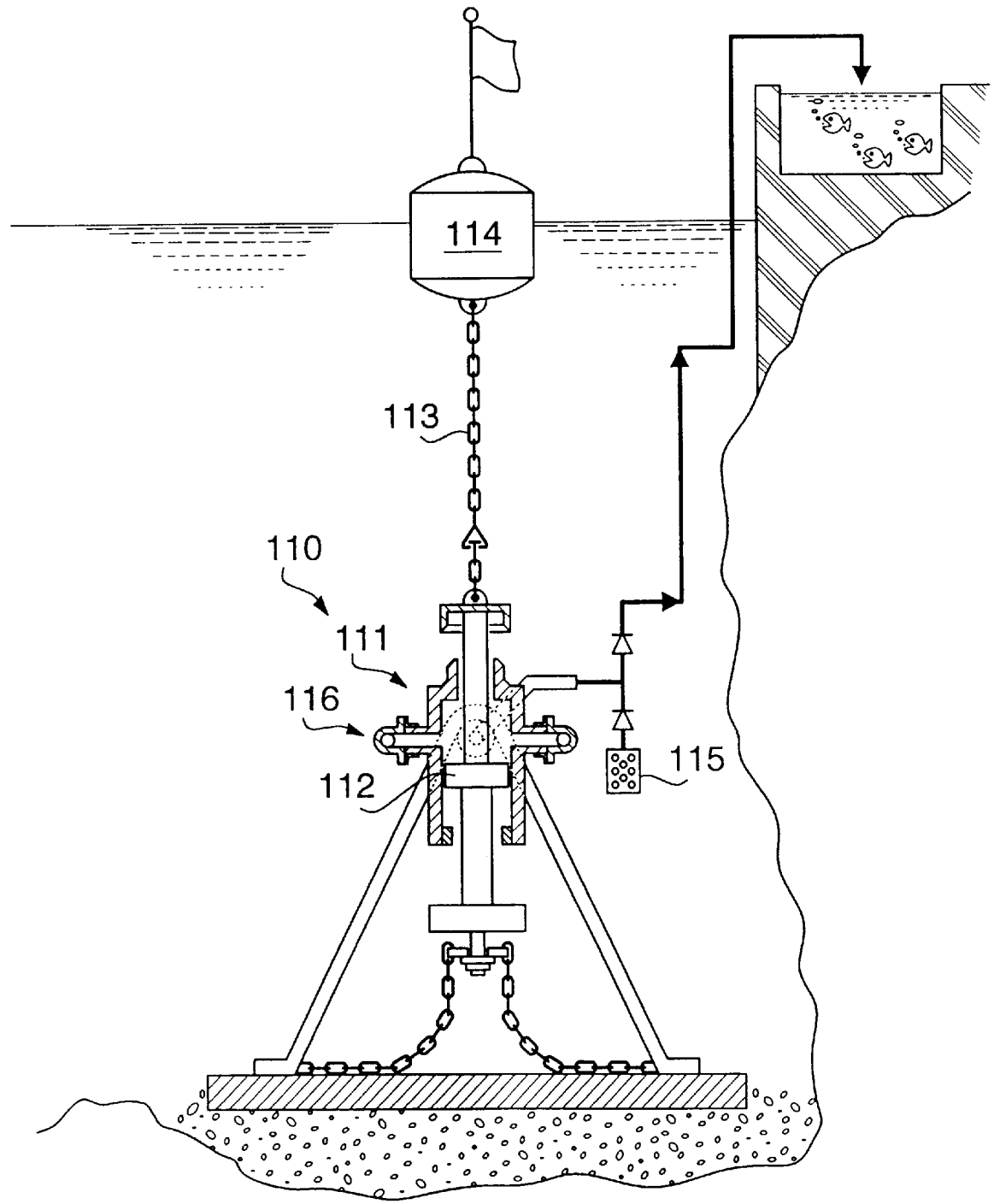
FIG. 9 is a sectional view of a conventional wave pump.

A wave pump 90B illustrated in FIG. 8 is different from the wave pump 90A shown in FIG. 7 in the ceiling 98*a*, float 93*a*, water discharge parts (discharge openings 99, discharge pipes 94 and check valves 100*a* and 100*b*) and water suction parts (water inlet pipe 95 and suction strainer 96).

A ceiling 26*b* and float 7*b* of the wave pump 90B are the same as those of the wave pump 1B shown in FIG. 2. The float 7*b* is secured upon being clamped by a pressure lid 48 and the ceiling 26*b* and tightened by clamping bolts 47*c*.

Water discharge pipes 106 extend radially outward from an upper outer periphery of a cylinder 92*b* in a radiant manner as viewed from the top. Protection nets 108 are provided at free ends of the water discharge pipes 106 to form water outlets 105 respectively. A check valve 107 is provided at a midpoint of each water discharge pipe 106 for only allowing the water to flow in a discharge direction so that the outside water does not flow into a cylinder chamber 91*b* from the water discharge pipes 106.

A water suction pipe 77 is laid near the bottom of the water and connected to a lower end of a hollow piston tube 3 via a flexible tube 18. A check valve 78 is provided at a midpoint of the water suction pipe 77 for only allowing the water to proceed toward the hollow piston tube 3. A free end portion of the water suction pipe 77 is bent upward and a suction strainer unit 76 is provided at the end.

Next, an operation of this wave pump will be described.

When the water surface S ascends, the float 7*b* and cylinder 92*b* ascend together thereby expanding the volume of the cylinder chamber 91*b*. As a result, the water comes into the cylinder chamber 91*b* from the suction strainer 76 via the water suction pipe 77 and hollow piston tube 3. At this point, the check valve 78 for water suction is opened whereas the check valves 107 for water discharge are closed so that the water does not flow back into the cylinder chamber 92*b* from the water discharge openings 105.

When the water surface S descends, the float 7*b* and cylinder 92*b* descend together thereby reducing the volume of the cylinder chamber 91*b*. Accordingly, the water is discharged out of the cylinder 92*b* from the discharge pipes 106 extending from the cylinder chamber 91*b*. During this operation, the check valves 107 are opened whereas the check valve 78 is closed so that the water is not discharged to the outside from the cylinder 92*b* through the water suction pipe 77.

As described above, the wave pump 90B is constructed as follows: the lower end of the wave pump is connected to the water suction pipe 77, and the upper portion of the pump is constituted by the tiltable hollow piston tube 3 extending upward to the water surface S, a piston portion 4 attached to an upper outer periphery of the hollow piston tube 3, the cylinder 92b slidably fitted over the piston portion 4 to define the cylinder chamber 91b above the piston portion 4, the float 7b attached to the cylinder 92b for moving the cylinder 92b up and down, and the water discharge pipes 106 connected to the cylinder 92b for feeding the lower layer water to the upper layer water from the cylinder chamber 91b via the check valves 107. Therefore, it is possible to easily and effectively pull the lower layer water to the water surface S by the wave pump having a simple structure.

What is claimed is:

1. A wave pump activated by an energy of a wave of a type including a submerged water suction part for drawing a water into the wave pump and a water conveyance part for transmitting the drawn water to a desired place from the wave pump, comprising:

a tiltable hollow piston tube having a lower portion and an upper portion, the lower portion being turnably connected to a submerged stationary saddle and communicated with the water conveyance part, the upper portion extending vertically upward toward a water surface, with a piston portion being formed over an outer periphery of the upper portion;

a cylinder fitted over the piston portion of the hollow piston tube such that it can slide up and down, a cylinder chamber being defined in an upper interior of the cylinder and being communicated with the water suction part;

a float provided on the cylinder for moving the cylinder up and down using the energy of the wave; and valve means provided on the water suction part and water conveyance part respectively for generating a flow of water in the hollow piston tube upon upward and downward movements of the cylinder.

2. The wave pump of claim 1, wherein the valve means includes check valves respectively provided on the water suction and conveyance parts.

3. The wave pump of claim 1, wherein the saddle is provided on a base block positioned on a bottom of the water, and the hollow piston tube is turnably connected to the saddle via a universal joint mechanism.

4. The wave pump of claim 3, wherein the piston portion of the hollow piston tube is equipped with a second float which exerts buoyance to always maintain the hollow piston tube in a vertically standing posture.

5. The wave pump of claim 2, wherein the water suction part includes a plurality of water suction pipes connected to an upper outer periphery of the cylinder, each water suction pipe having an inverted 1, shape and equipped with a check valve, and the water conveyance part includes a water conveyance pipe connected to a lower end of the hollow piston tube via a flexible tube, the water conveyance pipe being also equipped with a check valve.

6. The wave pump of claim 1, wherein the cylinder has air vent means provided at an upper portion of the cylinder for venting an air from the cylinder.

7. The wave pump of claim 5, wherein the float is a hollow member and has a hatch provided at a center of the float to expose an upper end surface of the cylinder, and air vent means is provided on the hatch.

8. The wave pump of claim 7, wherein the cylinder has a valve provided at the upper end surface of the cylinder for passage to the hatch and the hollow piston tube has a hanger at its upper end so that it is possible to suspend the hollow piston tube by a wire extending through the hatch.

9. A pump activated by a wave energy including a submerged water suction part for drawing in of a water and a water conveyance part for transferring of the drawn water, comprising:

a tiltable hollow piston tube having a lower portion and an upper portion, the lower portion being turnably connected to a submerged stationary saddle and communicated with the water conveyance part, the upper portion extending vertically upward toward a water surface, with a piston portion being formed over an outer periphery of the upper portion;

a cylinder engaged over the piston portion of the hollow piston tube such that it can slide up and down, a cylinder chamber being defined in an upper interior of the cylinder;

an annular float spacedly provided around an upper periphery of the cylinder for moving the cylinder up and down using the wave energy;

the water suction part including a water suction pipe connected with the upper periphery of the cylinder such that the water suction pipe extends downward between an outer periphery of the cylinder and an inner periphery of the float;

the water conveyance part including a water conveyance chamber connected to a lower end of the hollow piston tube such that the water conveyance chamber tiltably supports the hollow piston tube;

the water conveyance part further including a water conveyance pipe connected to the water conveyance chamber; and valve means provided on the water suction and conveyance pipes respectively for generating a flow of water in the hollow piston tube upon upward and downward movements of the cylinder.

10. The pump of claim 9, wherein the saddle is provided on a base block positioned on a bottom of the water, and the hollow piston tube is turnably connected to the saddle via a universal joint mechanism.

11. The pump of claim 9, wherein the piston portion of the hollow piston tube is equipped with another float which exerts buoyancy to always maintain the hollow piston tube in a vertically standing posture.

12. The pump of claim 9, wherein the cylinder has air vent means provided at its upper portion for venting an air from the cylinder.

* * * * *

UNITED STATES PATENT AND TRADEMARK OFFICE
CERTIFICATE OF CORRECTION

PATENT NO.   : 5,975,865
DATED        : November 2, 1999
INVENTOR(S)  : Y. Manabe It is certified that error appears in the above-identified patent and that said Letters Patent is hereby corrected as shown below:

Please cancel claim 9 of the patent, and in place thereof substitute the following amended claim 9:

-- 9. The wave pump of claim 1, wherein the float is an annular float spacedly provided around an upper periphery of the cylinder for moving the cylinder up and down using the wave energy;

the water suction part includes a water suction pipe connected with the upper periphery of the cylinder such that the water suction pipe extends downward between an outer periphery of the cylinder and an inner periphery of the float;

the water conveyance part includes a water conveyance chamber connected to a lower end of the hollow piston tube such that the water conveyance chamber tiltably supports the hollow piston tube; and the water convenyance part further includes a water conveyance pipe connected to the water conveyance chamber. --

Please add the following claims 13 to 42 of the application as amended:

-- 13. The wave pump of claim 1, wherein the float is provided at a top of the cylinder for moving the cylinder up and down using the wave energy, the float being held by the top of the cylinder and a presser lid. --

14. The wave pump of claim 13, wherein the valve means includes check valves provided on the water suction and conveyance parts respectively.

15. The wave pump of claim 13, wherein the saddle is provided on a base block positioned on a bottom of the water, and the hollow piston tube is turnably connected to the saddle via a universal joint mechanism.

16. The wave pump of claim 15, wherein the piston portion of the hollow piston tube is equipped with a second float which exerts buoyance to always maintain the hollow piston tube in a vertically standing posture.

17. The wave pump of claim 14, wherein the water suction part includes a plurality of water suction pipes connected to an upper outer periphery of the cylinder and the water conveyance part includes a water conveyance pipe connected to a lower end of the hollow piston tube via a flexible tube, each of the water suction and conveyance pipes being equipped with a check valve.

UNITED STATES PATENT AND TRADEMARK OFFICE
CERTIFICATE OF CORRECTION

PATENT NO. : 5,975,865
DATED : November 2, 1999
INVENTOR(S) : Y. Manabe

It is certified that error appears in the above-identified patent and that said Letters Patent is hereby corrected as shown below:

18. The wave pump of claim 13, wherein the float is an annular member, and connection means is provided on an annular body of the float for coupling a presser lid with a top of the cylinder.

19. The wave pump of claim 18, wherein air vent means is provided at the annular body of the float for venting an air from the cylinder.

20. The wave pump of claim 1, wherein the float is provided at a ceiling of the cylinder for moving the cylinder up and down using the wave energy,
    the float having a cylindrical shape and extending in a generally horizontal direction; and
    a plurality of vent holes formed in an upper periphery of the cylinder.

21. The wave pump of claim 20, wherein the valve means includes check valves provided on the water suction and conveyance parts respectively.

22. The wave pump of claim 20, wherein the saddle is provided on a base block positioned on a bottom of the water, and the hollow piston tube is turnably connected to the saddle via a universal joint mechanism.

23. The wave pump of claim 22, wherein the piston portion of the hollow piston tube is equipped with another float which exerts buoyancy to always maintain the hollow piston tube in a vertically standing posture.

24. The wave pump of claim of claim 21, wherein the water suction part includes a plurality of water suction pipes connected to an upper outer periphery of the cylinder and the water conveyance part includes a water conveyance pipe connected to a lower end of the hollow piston tube via a flexible tube, each of the water suction and conveyance pipes being equipped with a check valve.

25. The wave pump of claim 20, wherein the vent holes are formed in an upper portion of the cylinder near a cylindrical wall of a body of the float, and the ceiling of the cylinder defining the cylinder chamber guides an air in the cylinder to the vent holes.

UNITED STATES PATENT AND TRADEMARK OFFICE
CERTIFICATE OF CORRECTION

PATENT NO.   : 5,975,865
DATED        : November 2, 1999
INVENTOR(S)  : Y. Manabe It is certified that error appears in the above-identified patent and that said Letters Patent is hereby corrected as shown below:

26. The pump of claim 9, wherein the annular float is removably attached to an upper end of the cylinder, and a guide member is provided at an outer periphery of the cylinder for guiding sliding movement of the float when the float is installed or removed.

27. The pump of claim 9, wherein a plurality of water conveyance pipes are connected with the outer periphery of the water conveyance chamber via check valves respectively, and accumulators are connected with the water conveyance pipes respectively.

28. The wave pump of claim 1, wherein the water suction and conveyance parts are connected with a lower end of the hollow piston tube respectively.

29. The wave pump of claim 28, wherein the saddle is provided on a base block positioned on a bottom of the water, and the hollow piston tube is turnably connected to the saddle via a universal joint mechanism.

30. The wave pump of claim 28, wherein the piston portion of the hollow piston tube is equipped with a second float which exerts buoyancy to always maintain the hollow piston tube in a vertically standing posture.

31. The wave pump of claim 28, wherein the water suction part includes a water suction pipe;
> the water conveyance part includes a water conveyance pipe;
> the water suction pipe is connected with the water conveyance pipe via a connection pipe;
> the lower end of the hollow piston tube is connected with the connection pipe via a flexible pipe;
> a suction strainer is provided on the water suction pipe; and
> the valve means includes check valves provided on the water suction and conveyance pipes respectively.

32. The wave pump of claim 28, wherein the cylinder is equipped with air vent means provided at an upper portion of the cylinder for venting an air from the cylinder.

UNITED STATES PATENT AND TRADEMARK OFFICE
CERTIFICATE OF CORRECTION

PATENT NO. : 5,975,865
DATED : November 2, 1999
INVENTOR(S) : Y. Manabe

It is certified that error appears in the above-identified patent and that said Letters Patent is hereby corrected as shown below:

33. The wave pump of claim 1, wherein the water suction part is connected with a lower end of the hollow piston tube; and the water conveyance part is connected with an upper end of the cylinder and extends through the float.

34. The wave pump of claim 33, wherein the saddle is provided on a base block postitioned on a bottom of the water, and the hollow piston tube is turnably connected to the saddle via a universal joint mechanism.

35. The wave pump of claim 33, wherein the piston portion of the hollow piston tube is equipped with another float which exerts buoyancy to always maintain the hollow piston tube in a vertically standing posture.

36. The wave pump of claim 33, wherein the water suction part includes a water suction pipe connected with a lower end of the hollow piston tube via a flexible pipe, a suction strainer is provided on the water suction pipe, the water conveyance part includes a water conveyance pipe connected with an upper end of the cylinder, the water conveyance pipe extending through the float and having an exit opened in an outer periphery of the float, and the valve means includes check valves provided on the water suction and discharge pipes respectively.

37. The wave pump of claim 33, wherein the cylinder is equipped with air vent means provided at an upper portion of the cylinder for venting an air from the cylinder.

38. The wave pump of claim 1, wherein the water suction part is connected with a lower end of the hollow piston tube.

39. The wave pump of claim 38, wherein the saddle is provided on a base block positioned on a bottom of the water, and the hollow piston tube is turnably connected to the saddle via a universal joint mechanism.

40. The wave pump of claim 38, wherein the piston portion of the hollow piston tube is equipped with another float which exerts buoyancy to always maintain the hollow piston tube in a vertically standing posture.

UNITED STATES PATENT AND TRADEMARK OFFICE
CERTIFICATE OF CORRECTION

PATENT NO. : 5,975,865
DATED : November 2, 1999
INVENTOR(S) : Y. Manabe

It is certified that error appears in the above-identified patent and that said Letters Patent is hereby corrected as shown below:

41. The wave pump of claim 38, wherein the water suction part includes a water suction pipe connected with a lower end of the hollow piston tube via a flexible pipe, a suction strainer is provided on the water suction pipe, the water conveyance part includes a plurality of water conveyance pipes connected with an upper periphery of the cylinder, and the valve means includes check valves provided on the water suction and discharge pipes respectively.

42. The wave pump of claim 38, wherein the cylinder is equipped with air vent means provided at an upper portion of the cylinder for venting an air from the cylinder. --

Signed and Sealed this

Eleventh Day of September, 2001

*Attest:*

*Attesting Officer*

NICHOLAS P. GODICI
*Acting Director of the United States Patent and Trademark Office*